(12) United States Patent
Xu (10) Patent No.: US 12,151,352 B2
(45) Date of Patent: Nov. 26, 2024

(54) MULTIFUNCTIONAL QUICK ASSEMBLY MOUNTING HOLE FOR SWING TOOLS

(71) Applicant: Yangzhou Shengye Machinery Co., Ltd, Jiangsu (CN)

(72) Inventor: Hongming Xu, Jiangsu (CN)

(*) Notice: Subject to any disclaimer, the term of this patent is extended or adjusted under 35 U.S.C. 154(b) by 1003 days.

(21) Appl. No.: 17/257,327

(22) PCT Filed: Apr. 2, 2020

(86) PCT No.: PCT/CN2020/082871
§ 371 (c)(1),
(2) Date: Dec. 31, 2020

(87) PCT Pub. No.: WO2021/189520
PCT Pub. Date: Sep. 30, 2021

(65) Prior Publication Data
US 2022/0088760 A1    Mar. 24, 2022

(30) Foreign Application Priority Data

Mar. 24, 2020   (CN) .......................... 202010211798.X (51) Int. Cl.
| | | |
|---|---|---|
| *B25F 3/00* | (2006.01) | |
| *B23B 31/10* | (2006.01) | |
| *B23D 61/00* | (2006.01) | |
| B24B 23/04 | (2006.01) | |
| B27B 19/00 | (2006.01) | |

(52) U.S. Cl.
CPC ................ *B25F 3/00* (2013.01); *B23B 31/10* (2013.01); *B23D 61/006* (2013.01); *B24B 23/04* (2013.01); *B27B 19/006* (2013.01)

(58) Field of Classification Search
CPC ....... B23B 31/10; B23D 61/006; B24B 23/04; B25F 3/00; B27B 19/006
See application file for complete search history.

(56) References Cited

U.S. PATENT DOCUMENTS 10,427,229 B2 * 10/2019 Karlen ................ B23D 61/006

FOREIGN PATENT DOCUMENTS

| | | |
|---|---|---|
| CN | 103101037 A | 5/2013 |
| CN | 203818114 U | 9/2014 |
| CN | 104191419 A | 12/2014 |

(Continued)

*Primary Examiner* — Eric A. Gates
*Assistant Examiner* — Reinaldo A Vargas Del Rio (57) ABSTRACT

The invention discloses a multifunctional quick assembly mounting hole for swing tools, comprising an assembly bottom plate, a bending transition segment, and a tool head connecting plate, wherein the bending transition segment is arranged between the assembly bottom plate and the tool head connecting plate; the bending transition segment is arranged obliquely, and the bending transition segment is in arc transition between the assembly bottom plate and the tool head connecting plate; the assembly bottom plate is provided with a first assembly positioning boss and a second quick assembly positioning boss. The invention relates to the technical field of electric tools, in particular to a multifunctional quick assembly mounting hole for swing tools with high practicability, simple structure, convenient carrying, quick assembly, wide application range, which is suitable for multiple machine connection modes.

8 Claims, 5 Drawing Sheets

(56) References Cited

FOREIGN PATENT DOCUMENTS

| CN | 105538240 A | 5/2016 | |
|---|---|---|---|
| CN | 106142019 A | 11/2016 | |
| DE | 102012204864 A1 * | 6/2013 | ........... B23D 61/006 |
| DE | 102012201624 A1 | 8/2013 | |
| EP | 3135439 A1 | 3/2017 | |
| WO | 2019035025 A1 | 2/2019 | |

* cited by examiner

MULTIFUNCTIONAL QUICK ASSEMBLY MOUNTING HOLE FOR SWING TOOLS

BACKGROUND OF THE INVENTION

1. Field of the Invention

The invention relates to the technical field of electric tools, in particular to a multifunctional quick assembly mounting hole for swing tools.

2. Description of the Related Art

With the rapid development of industrial technology today and continuous development of industrial technology, more and more various electric tools have penetrated into many fields, such as cutting, polishing, trimming, drilling and so on. These electric tools usually comprise a drive motor, a transmission device connected to the drive motor, and a tool head driven by the transmission device. Tool heads of different structures have different functions. The tool heads people used in the past did not have the function of quick assembly; it is very troublesome to replace tool heads with different functions, which not only wastes time and tool materials, but also has extremely low labor productivity and is not easy to store. Common tool heads include straight saw blades, circular saw blades, triangular sanding discs, scrapers, etc., which can meet work requirements such as sawing, cutting, grinding, and scraping. Later, people designed the tool head into a detachable structure; by replacing the tool head, different functions were obtained, which not only greatly saved time and tool materials, but also facilitated storage, and it can also be carried when working out. At present, different factories use different specifications of the hole-type interface, which makes the matching tool variety. It is extremely inconvenient for users to purchase accessories, which not only wastes consumers' time to purchase, but also makes it difficult to purchase accessories when using products from the same factory.

SUMMARY OF THE INVENTION

In order to solve the existing problems above, the invention provides a multifunctional quick assembly mounting hole for swing tools with high practicability, simple structure, convenient carrying, quick assembly, wide application range, which is suitable for multiple machine connection modes.

The invention adopts the following technical solutions: multifunctional quick assembly mounting hole for swing tools, comprising an assembly bottom plate, a bending transition segment, and a tool head connecting plate, wherein the bending transition segment is arranged between the assembly bottom plate and the tool head connecting plate; the bending transition segment is arranged obliquely, and the bending transition segment is in arc transition between the assembly bottom plate and the tool head connecting plate; the assembly bottom plate is provided with a first assembly positioning boss and a second quick assembly positioning boss; the center of the second quick assembly positioning boss is provided with a quick assembly through hole; one side of the assembly bottom plate is provided with clearance openings that are in through connection to the quick assembly through hole; the assembly bottom plate is provided with limiting clearance through holes that penetrate the assembly bottom plate and are in through connection to the second quick assembly positioning boss and the quick assembly through hole; the limiting clearance through holes are symmetrically arranged on both sides of the second quick assembly positioning boss, and the clearance openings are symmetrically arranged on both sides of the second quick assembly positioning boss; the two sides of the quick assembly through hole are symmetrically provided with inside limiting holes that are in through connection to the quick assembly through hole; the upper wall of the second quick assembly positioning boss is provided outside positioning holes, and the outside positioning holes are arranged in a flower-shaped matrix array around the center of the quick assembly through hole; the first assembly positioning boss is arranged as a regular prismoid with openings at the lower end; the upper wall of the first assembly positioning boss is provided with a central hole penetrating up and down and flower-shaped holes that are in through connection to the central hole; the flower-shaped holes are circumferentially distributed at equal intervals along the edge of the central hole; the side wall of the first assembly positioning boss is provided with hollow arc-shaped bulges that are in through connection to the first assembly positioning boss.

Further, the number of sides of the upper top surface of the first assembly positioning boss is 6-24, which enables the structure of the assembly positioning boss to be more stable, and at the same time fixes the saw shaft of the swing saw more firmly, and increases the stability of the assembly between the machine and the saw blade; the diameter of the central hole is 6-15 mm; the number of the flower-shaped holes is 4-12; the thickness of each arc-shaped bulge is 3-6 mm, which plays a role of limiting and fixing the saw shaft of the swing saw.

Further, each outside positioning hole comprises a semicircular through hole and a square through hole that are in through connection and streamlined transitional connection; the edge of the square through hole is formed by splicing multiple irregular arc-shaped segments, and the multiple arc-shaped segments are in streamlined transitional connection. The square through holes connected by multiple arc-shaped segments can better limit and fix the mounting holes of various shapes, increase the limiting contacts with the mounting holes, which make the fixing more firm, and increase the stability of the assembly between the machine and the saw blade. The semicircular through hole is arranged close to the quick assembly through hole, and the radius of the semicircular through hole is 1-1.5 mm; the included angle of each clearance opening is 60°-85°, and the included angle of each limiting clearance through hole is 90°-120°, which is convenient for directly fixing the saw shaft of the swing saw by plugging.

Further, both sides of the assembly bottom plate are provided with reinforcing ribs, so that the structure of the assembly bottom plate is stronger, not easily damaged, and has a long service life.

Further, the tool head connecting plate is arranged on the side of the assembly bottom plate away from the clearance opening, which is convenient for connecting the straight saw blade; the bending transition segment is provided with a plurality of reinforcing rib bumps, which effectively increases the structural rigidity.

Further, the tool head connecting plates are arranged on both sides of the assembly bottom plate, which is convenient for connecting the circular saw blades.

Further, the center of the limiting clearance through hole and the center of the quick assembly through hole are on the same axis; when the saw shaft of the swing saw is clamped in the quick assembly through hole, the edge of the saw shaft and the edge of the limit avoidance through hole contact to limit the saw shaft, thus avoiding machine collision. The height of the first assembly positioning boss to the assembly bottom plate is equal to the height of the second quick assembly positioning boss to the assembly bottom plate, which avoids that when one of the first assembly positioning boss or the second quick assembly positioning boss is used to install and fix the swing saw shaft, the other of the first assembly positioning boss or the second quick assembly positioning boss causes interference during the operation of the swing saw, to ensure the normal operation of the swing saw for smooth grinding and cutting.

Preferably, the number of the inside limiting holes is six; each outside positioning hole comprises an outside middle positioning hole and an outside side positioning hole; the outside middle positioning holes are arranged on both sides of the middle of the quick assembly through hole, and the outside side positioning holes are arranged on both sides of the outside middle positioning hole; each inside limiting hole comprises an inside middle limiting hole and an inside side limiting hole; the inside middle limiting holes are arranged on both sides of the middle of the quick assembly through hole, and the inside side limiting holes are arranged on both sides of the inside middle limiting hole.

Further, the inside middle limiting hole is partitioned or communicated with the outside middle positioning hole, which is convenient for positioning and the structure is stronger.

Further, the tool head connecting plate is provided with solder joint grooves, and the tool head such as a saw blade can be directly connected to the tool head connecting plate by welding through the solder joint grooves.

The advantageous effects of the invention with the above structure are as follows: the multifunctional quick assembly mounting hole for swing tools of the invention has a simple structure and a reasonable design, which can be configured with mounting holes of various shapes and has a wide range of applications. By replacing the tool heads with different technical parameters, the utilization space of the swing type electric tool can be expanded, and the omnibearing and multi-angle sawing can be realized, which greatly improves the utilization rate of the electric tool. Due to the adoption of multi-angle limiting, the invention ensures the safety and stability of operation. When replacing, simply squeeze the main body of the handle on the swing type electric tool by hand and loosen the tensioning mandrel on the swing saw, and the replacement can be achieved conveniently, quickly and easily. There is no need to unscrew all the nuts from the saw shaft, and the quick assembly can be realized by plugging and unplugging through the clearance openings, which is convenient and quick, suitable for a variety of assembly holes, and has strong versatility, truly realizes one-time, quick, convenient and safe cutting.

The drawings are used to provide a further understanding of the invention and constitute a part of the specification. The drawings and embodiments of the invention are used to explain the invention, and do not constitute a limitation to the invention. In the figures, 1 refers to the assembly bottom plate; 2 refers to the bending transition segment; 3 refers to the tool head connecting plate; 4 refers to the first assembly positioning boss; 5 refers to the second quick assembly positioning boss; 6 refers to the quick assembly through hole; 7 refers to the clearance opening; 8 refers to the limiting clearance through hole; 9 refers to the reinforcing rib bump; 10 refers to the inside limiting hole; 11 refers to the outside positioning hole; 12 refers to the central hole; 13 refers to the flower-shaped hole; 14 refers to the arc-shaped bulge; 15 refers to the semicircular through hole; 16 refers to the square through hole; 17 refers to the irregular arc-shaped segment; 18 refers to the reinforcing rib; 19 refers to the solder joint groove; 20 refers to the outside middle positioning hole; 21 refers to the outside side positioning hole; 22 refers to the inside middle limiting hole; 23 refers to the inside side limiting hole.

DETAILED DESCRIPTION OF THE PREFERRED EMBODIMENTS

The technical solutions in the embodiments of the invention will be described clearly and completely hereinafter with reference to the drawings in the embodiments of the invention. Obviously, the described embodiments are only a part of the embodiments of the invention, rather than all the embodiments. All other embodiments obtained by those of ordinary skill in the art without creative efforts based on the embodiments of the invention shall fall within the protection scope of the invention.

As shown in FIG. 1-6, the invention provides a multifunctional quick assembly mounting hole for swing tools, comprising an assembly bottom plate 1, a bending transition segment 2, and a tool head connecting plate 3, wherein the bending transition segment 2 is arranged between the assembly bottom plate 1 and the tool head connecting plate 3; the bending transition segment 2 is arranged obliquely, and the bending transition segment 2 is in arc transition between the assembly bottom plate 1 and the tool head connecting plate 3; the assembly bottom plate 1 is provided with a first assembly positioning boss 4 and a second quick assembly positioning boss 5; the center of the second quick assembly positioning boss 5 is provided with a quick assembly through hole 6; one side of the assembly bottom plate 1 is provided with clearance openings 7 that are in through connection to the quick assembly through hole 6, and the clearance openings 7 facilitate to directly fixing the saw shaft by plugging and unplugging; the assembly bottom plate 1 is provided with limiting clearance through holes 8 that penetrate the assembly bottom plate 1 and are in through connection to the second quick assembly positioning boss 5 and the quick assembly through hole 6; the limiting clearance through holes 8 are symmetrically arranged on both sides of the second quick assembly positioning boss 5, and the clearance openings 7 are symmetrically arranged on both sides of the second quick assembly positioning boss 5; the two sides of the quick assembly through hole 6 are symmetrically provided with inside limiting holes 10 that are in through connection to the quick assembly through hole 6; the upper wall of the second quick assembly positioning boss 5 is provided outside positioning holes 11, and the outside positioning holes 11 are arranged in a flower-shaped matrix array around the center of the quick assembly through hole 6; the first assembly positioning boss 4 is arranged as a regular prismoid with openings at the lower end; the upper wall of the first assembly positioning boss 4 is provided with a central hole 12 penetrating up and down and flower-shaped holes 13 that are in through connection to the central hole 12; the flower-shaped holes 13 are circumferentially distributed at equal intervals along the edge of the central hole 12; the side wall of the first assembly positioning boss 4 is provided with hollow arc-shaped bulges 14 that are in through connection to the first assembly positioning boss 4.

The number of sides of the upper top surface of the first assembly positioning boss 4 is 6-24; the diameter of the central hole 12 is 6-15 mm; the number of the flower-shaped holes 13 is 4-12; the thickness of each arc-shaped bulge 14 is 3-6 mm. Each outside positioning hole 11 comprises a semicircular through hole 15 and a square through hole 16 that are in through connection and streamlined transitional connection; the edge of the square through hole 16 is formed by splicing multiple irregular arc-shaped segments 17, and the multiple arc-shaped segments 17 are in streamlined transitional connection. The semicircular through hole 15 is arranged close to the quick assembly through hole 6, and the radius of the semicircular through hole 15 is 1-1.5 mm; the included angle of each clearance opening 7 is 60°-85°, and the included angle of each limiting clearance through hole 8 is 90°-120°. Both sides of the assembly bottom plate 1 are provided with reinforcing ribs 18.

The center of the limiting clearance through hole 8 and the center of the quick assembly through hole 6 are on the same axis; the height of the first assembly positioning boss 4 to the assembly bottom plate 1 is equal to the height of the second quick assembly positioning boss 5 to the assembly bottom plate 1. The number of the inside limiting holes 10 is six; each outside positioning hole 11 comprises an outside middle positioning hole 20 and an outside side positioning hole 21; the outside middle positioning holes 20 are arranged on both sides of the middle of the quick assembly through hole 6, and the outside side positioning holes 21 are arranged on both sides of the outside middle positioning hole 20; each inside limiting hole 10 comprises an inside middle limiting hole 22 and an inside side limiting hole 23; the inside middle limiting holes 22 are arranged on both sides of the middle of the quick assembly through hole 6, and the inside side limiting holes 23 are arranged on both sides of the inside middle limiting hole 22. The inside middle limiting hole 22 is partitioned or communicated with the outside middle positioning hole 20. The tool head connecting plate 3 is provided with solder joint grooves 19.

Figure 1:
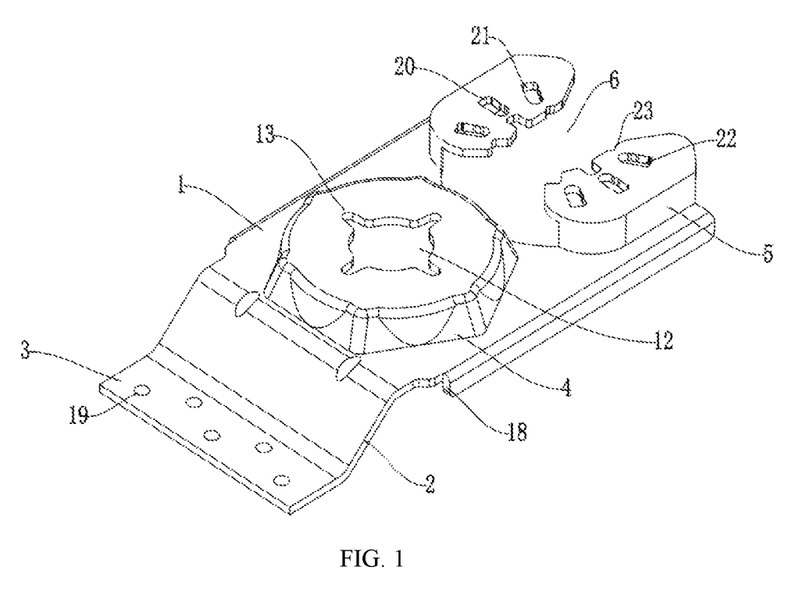
FIG. 1 is a schematic diagram of the multifunctional quick assembly mounting hole for swing tools of the invention.
Figure 2:
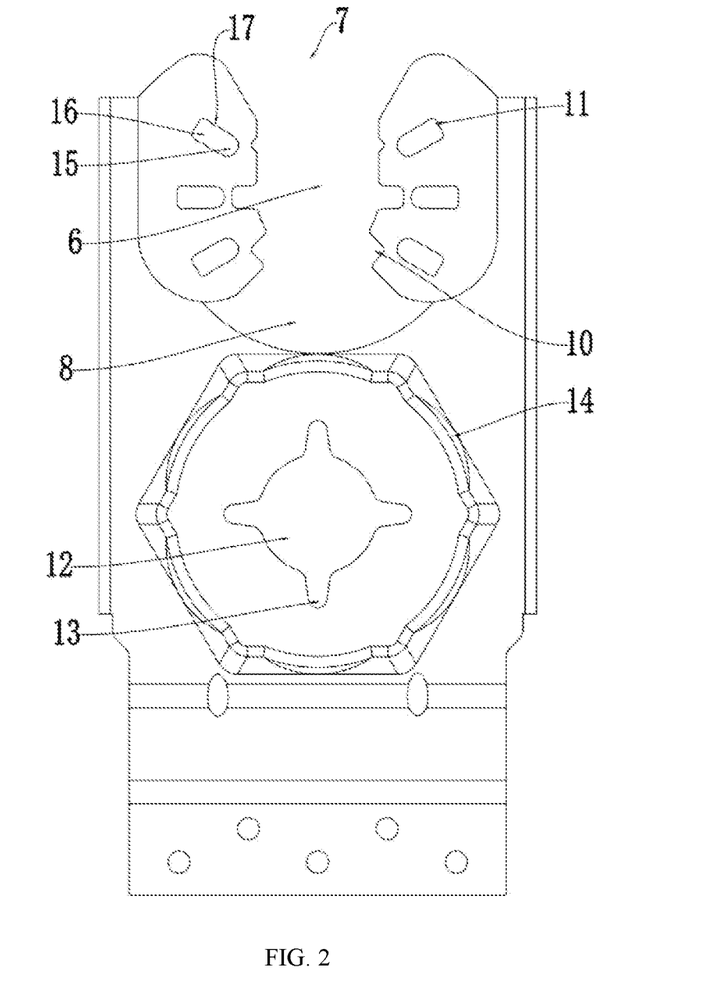
FIG. 2 is a top view of the multifunctional quick assembly mounting hole for swing tools of the invention.
Figure 3:
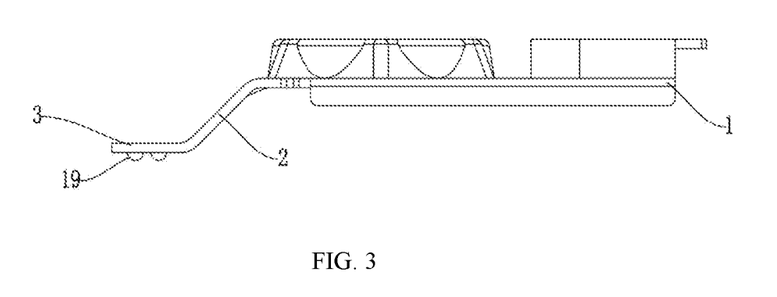
FIG. 3 is a side view of the multifunctional quick assembly mounting hole for swing tools of the invention.
Figure 4:
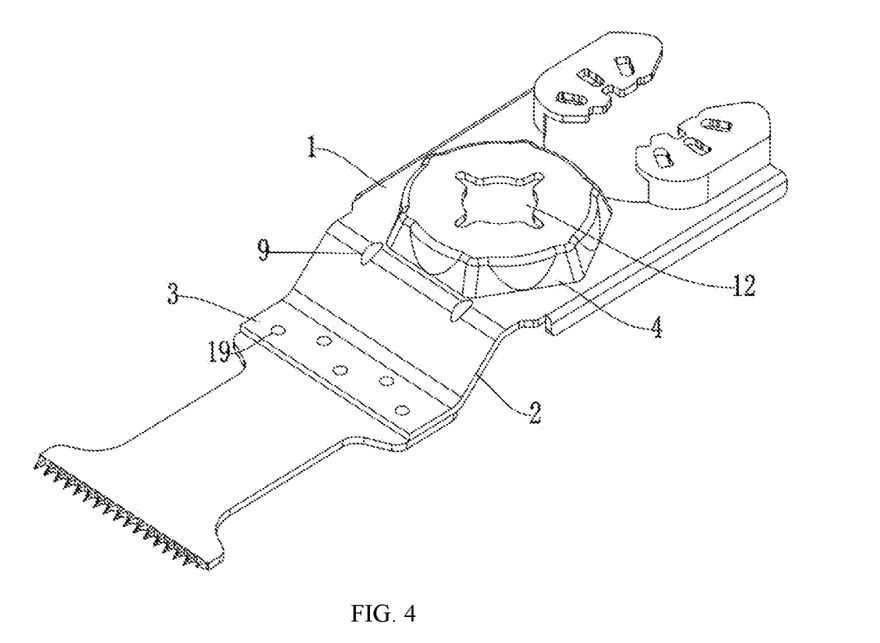
FIG. 4 is a schematic diagram of Embodiment 1 of the multifunctional quick assembly mounting hole for swing tools of the invention.

Embodiment 1: as shown in FIG. 4, the tool head connecting plate 3 can be arranged on the side of the assembly bottom plate 1 away from the clearance opening 7, which is convenient for connecting the straight saw blade; the bending transition segment 2 is provided with a plurality of reinforcing rib bumps 9.

Figure 5:
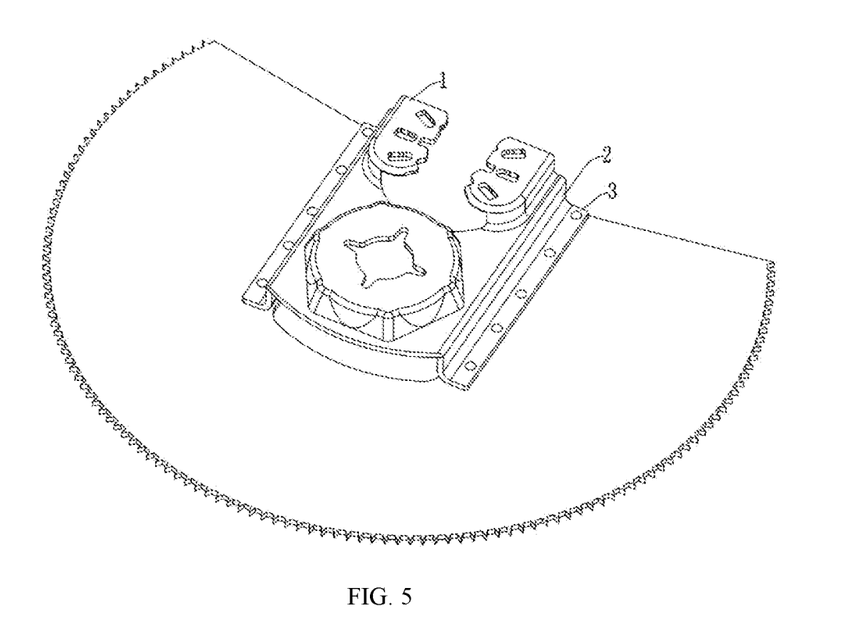
FIG. 5 is a schematic diagram of Embodiment 2 of the multifunctional quick assembly mounting hole for swing tools of the invention.
Figure 6:
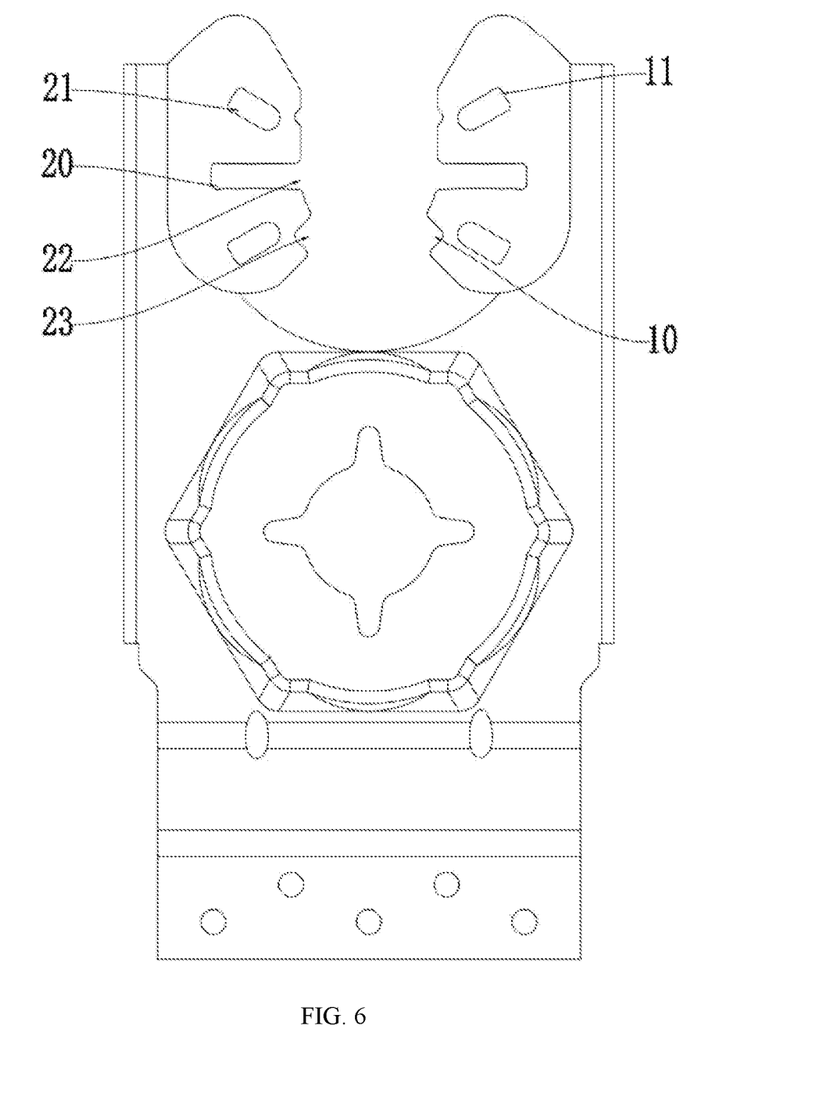
FIG. 6 is a schematic diagram of an embodiment of the multifunctional quick assembly mounting hole for swing tools of the invention.

Embodiment 2: as shown in FIG. 5, the tool head connecting plates 3 can also be arranged on both sides of the assembly bottom plate 1, which is convenient for connecting the straight saw blade;

As shown in FIG. 6, in one embodiment, the two inside limiting holes 10 provided on both sides of the middle of the quick assembly through hole 6 can be communicated with the outside positioning hole 11, so as to better position and install the saw shaft of the swing saw, and the fixing is more firm.

In specific use, according to different working conditions, the tool connecting plate is fixedly connected to different tool heads by welding or riveting through the solder point grooves 19; as shown in FIG. 4, the tool head connecting plate 3 can be arranged on the side of the assembly bottom plate away from the clearance opening, and the straight saw blade can be connected and fixed by welding or riveting; as shown in FIG. 5, the tool head connecting plate 3 can also be arranged on both sides of the assembly bottom plate, and the straight saw blade can be connected and fixed by welding or riveting. Different installation and fixing methods are chosen according to different shapes of assembly holes; for swing saws fixed by nuts, loosen the nut on the saw shaft of the swing saw, then insert the saw shaft of the swing saw into the quick assembly through hole 6 through the clearance openings 7, and perform limiting assembly of the swing saw shaft through the quick assembly hole and the inside limiting hole 10; tighten the nut on the saw shaft again so that the assembly bottom plate 1 is fixed between the nut and the swing saw to realize the quick assembly of the tool head; for swing saws fixed by a ring-shaped boss, align the outside positioning hole 11 with the boss on the swing saw and insert it so that the tool head is firmly fixed on the swing saw to avoid misalignment; multi-angle limiting is adopted to ensure the safety and stability of operation; for swing saws fixed by the tensioning mandrel on the swing saw, insert the main body of the knob on the swing type electric tool into the central hole 12 by hand, and release the tensioning mandrel on the swing saw, then the replacement can be realized conveniently, quickly and easily.

The multifunctional quick assembly mounting hole for swing tools of the invention can be configured with mounting holes of various shapes. In different working conditions, or when the material being sawed is inconsistent in softness and hardness, by replacing the tool heads with different technical parameters, the utilization space of the swing type electric tool can be expanded, and the omnibearing and multi-angle sawing can be realized, which greatly improves the utilization rate of the electric tool. A quick assembly function is provided when replacing the tool head on the swing saw. Due to the adoption of multi-angle limiting, the invention ensures the safety and stability of operation. When replacing the tool head with quick assembly function, insert the main body of the knob on the swing type electric tool into the central hole by hand, and release the tensioning mandrel on the swing saw, then the replacement can be realized conveniently, quickly and easily; there is no need to unscrew all the nuts from the saw shaft, and the quick assembly can be realized by plugging and unplugging through the clearance openings 7, which is convenient and quick, suitable for a variety of assembly holes, and has strong versatility. The swing tool heads are all made of steel materials. In actual operation, due to the small weight and strong rigidity of the tool heads, the service life of the electric tool and the overall safety performance in actual operation can be greatly improved, which truly realizes one-time, quick, convenient and safe cutting.

It should be noted that in the specification, relational terms such as "first" and "second" are only used to distinguish one entity or operation from another entity or operation, rather than require or imply any such actual relationship or order between these entities or operations. Moreover, the terms "comprise", "include" or any other variants thereof are intended to cover non-exclusive inclusion, so that a process, method, article or device including a series of elements not only includes those elements, but also includes other elements that are not explicitly listed, or also includes elements inherent to this process, method, article or device.

Although the embodiments of the invention have been shown and described, for those of ordinary skill in the art, various changes, modifications, substitutions, and variants can be made to these embodiments without departing from the principle and spirit of the invention. The protection scope of the invention is defined by the appended claims and the equivalents thereof.

The invention claimed is:

1. A multifunctional quick assembly mounting hole for swing tools, comprising an assembly bottom plate, a bending transition segment, and a tool head connecting plate, wherein the bending transition segment is arranged between the assembly bottom plate and the tool head connecting plate; the bending transition segment is arranged obliquely, and the bending transition segment is in arc transition between the assembly bottom plate and the tool head connecting plate; the assembly bottom plate is provided with a first assembly positioning boss and a second quick assembly positioning boss; the center of the second quick assembly positioning boss is provided with a quick assembly through hole; one side of the assembly bottom plate is provided with clearance openings that are in through connection to the quick assembly through hole; the assembly bottom plate is provided with limiting clearance through holes that penetrate the assembly bottom plate and are in through connection to the second quick assembly positioning boss and the quick assembly through hole; the limiting clearance through holes are symmetrically arranged on both sides of the second quick assembly positioning boss, and the clearance openings are symmetrically arranged on both sides of the second quick assembly positioning boss; the two sides of the quick assembly through hole are symmetrically provided with inside limiting holes that are in through connection to the quick assembly through hole; the upper wall of the second quick assembly positioning boss is provided outside positioning holes, and the outside positioning holes are arranged in a flower-shaped matrix array around the center of the quick assembly through hole; the first assembly positioning boss is arranged as a regular prismoid with openings at the lower end; the upper wall of the first assembly positioning boss is provided with a central hole penetrating up and down and flower-shaped holes that are in through connection to the central hole; the flower-shaped holes are circumferentially distributed at equal intervals along the edge of the central hole; the side wall of the first assembly positioning boss is provided with hollow arc-shaped bulges that are in through connection to the first assembly positioning boss;

wherein the number of the inside limiting holes is six; each outside positioning hole comprises an outside middle positioning hole and an outside side positioning hole; the outside middle positioning holes are arranged on both sides of the middle of the quick assembly through hole, and the outside side positioning holes are arranged on both sides of the outside middle positioning hole; each inside limiting hole comprises an inside middle limiting hole and an inside side limiting hole; the inside middle limiting holes are arranged on both sides of the middle of the quick assembly through hole, and the inside side limiting holes are arranged on both sides of the inside middle limiting hole.

2. The multifunctional quick assembly mounting hole for swing tools according to claim 1, wherein the number of sides of the upper top surface of the first assembly positioning boss is 6-24; the diameter of the central hole is 6-15 mm; the number of the flower-shaped holes is 4-12; the thickness of each arc-shaped bulge is 3-6 mm.

3. The multifunctional quick assembly mounting hole for swing tools according to claim 1, wherein each outside positioning hole comprises a semicircular through hole and a square through hole that are in through connection and streamlined transitional connection; the edge of the square through hole is formed by splicing multiple irregular arc-shaped segments, and the multiple arc-shaped segments are in streamlined transitional connection; the semicircular through hole is arranged close to the quick assembly through hole, and the radius of the semicircular through hole is 1-1.5 mm; the included angle of each clearance opening is 60°-85°, and the included angle of each limiting clearance through hole is 90°-120°.

4. The multifunctional quick assembly mounting hole for swing tools according to claim 1, wherein both sides of the assembly bottom plate are provided with reinforcing ribs.

5. The multifunctional quick assembly mounting hole for swing tools according to claim 4, wherein the tool head connecting plate is arranged on the side of the assembly bottom plate away from the clearance opening; the bending transition segment is provided with a plurality of reinforcing rib bumps, the tool head connecting plate is provided with solder joint grooves.

6. The multifunctional quick assembly mounting hole for swing tools according to claim 1, wherein the tool head connecting plates are arranged on both sides of the assembly bottom plate, the tool head connecting plate is provided with solder joint grooves.

7. The multifunctional quick assembly mounting hole for swing tools according to claim 1, wherein the center of the limiting clearance through hole and the center of the quick assembly through hole are on the same axis; the height of the first assembly positioning boss to the assembly bottom plate is equal to the height of the second quick assembly positioning boss to the assembly bottom plate.

8. The multifunctional quick assembly mounting hole for swing tools according to claim 1, wherein the inside middle limiting hole is partitioned or communicated with the outside middle positioning hole.

* * * * *